Nov. 22, 1966 M. W. SCHRADER 3,286,535
CONNECTING ROD ASSEMBLY
Filed Nov. 3, 1964 2 Sheets-Sheet 2
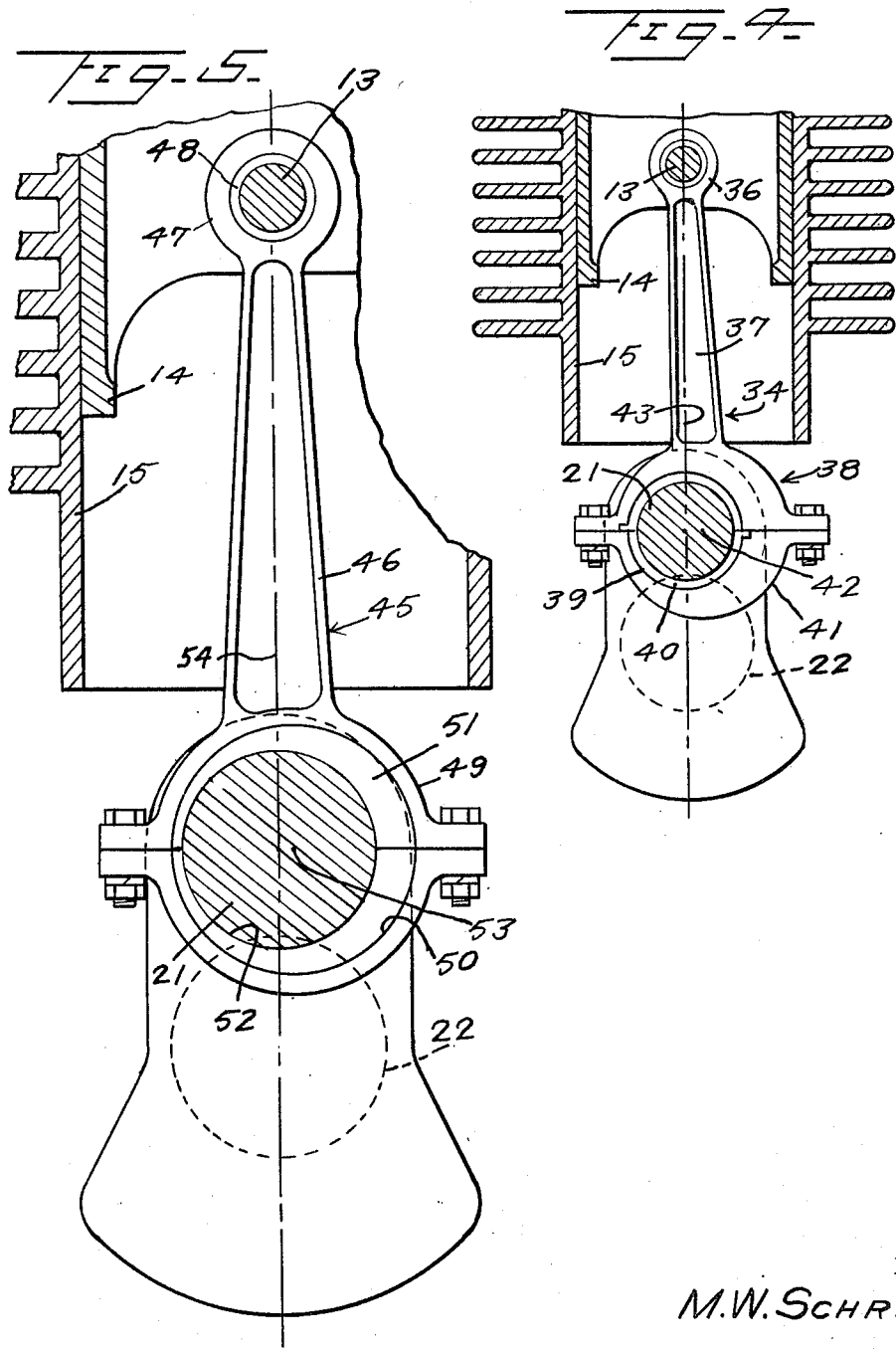
INVENTOR
M.W. SCHRADER
BY John N. Randolph
ATTORNEY United States Patent Office 3,286,535
Patented Nov. 22, 1966

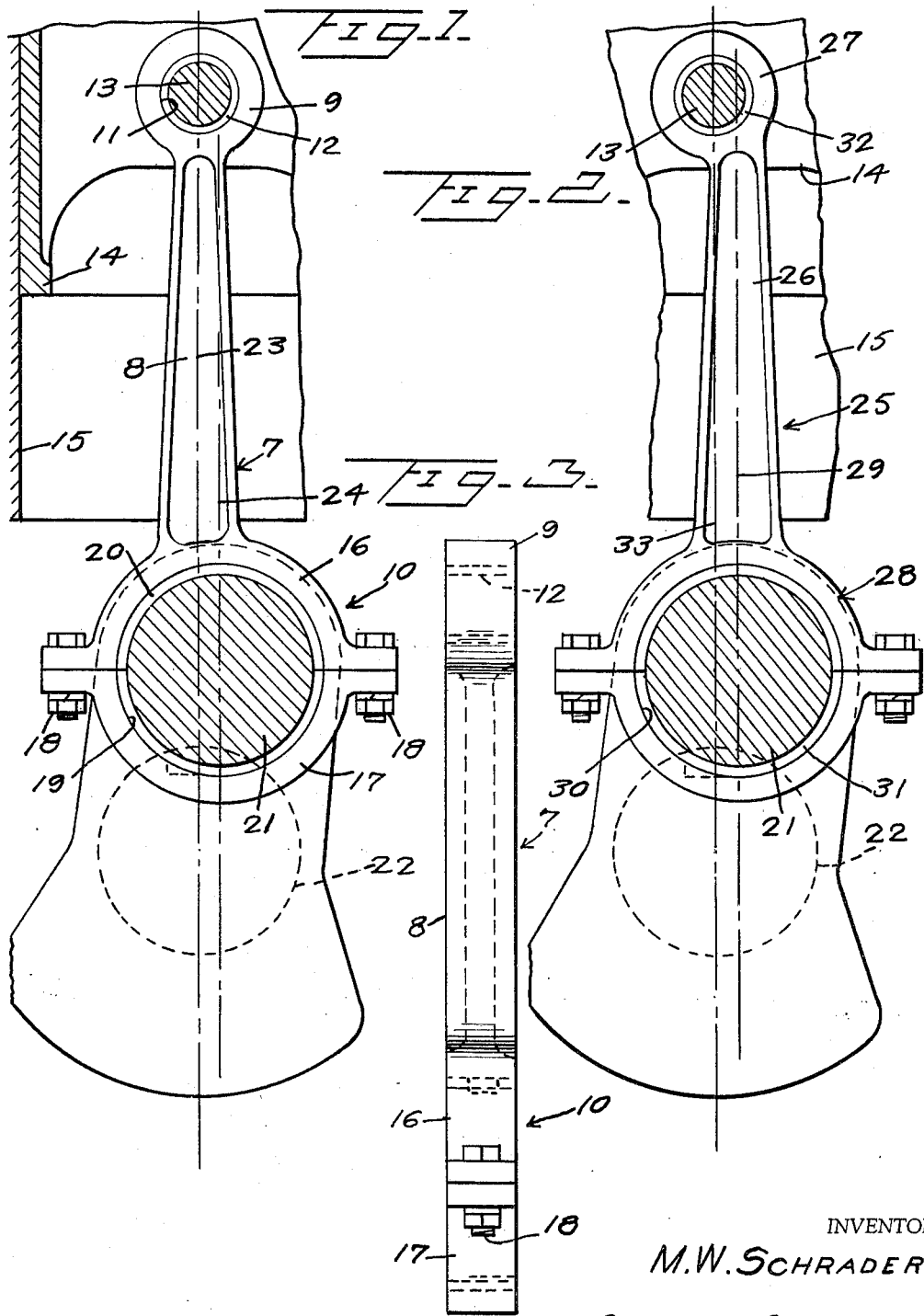

3,286,535
CONNECTING ROD ASSEMBLY
Martin W. Schrader, 1601 Hesket St., Sacramento, Calif.
Filed Nov. 3, 1964, Ser. No. 408,566
1 Claim. (Cl. 74—44)

This invention relates to a connecting rod assembly for connecting a reciprocating piston to a crankpin of a crankshaft, and more particularly to a connecting rod wherein the weight mass is laterally offset relative to the longitudinal center of the connecting rod toward the leading part thereof with respect to the direction of rotation of the crankshaft when the crankpin is moving between the axis of the crankshaft and the piston.

Another object of the invention is to provide a connecting rod having a preponderance of its weight or its weight mass laterally offset relative to the longitudinal axis thereof whereby the connecting rod will function as an unbalanced pendulum tending to propel the crankpin, to which it is connected, past a dead center position between the crankshaft and wrist pin at the commencement of the power stroke of the piston, so that the maximum effect of the thrust of the piston on its power stroke will be utilized to enable the piston to exert a greater torque on the crankshaft.

Various other objects and advantages of the invention will hereinafter become more fully apparent from the following description of the drawings, illustrating presently preferred embodiments thereof, and wherein:

FIGURE 1 is a side elevational view, partly broken away and partly in section, showing an embodiment of the connecting rod assembly connected to a piston wrist pin and a crankpin of a crankshaft;

FIGURE 2 is a similar view of a second embodiment of the connecting rod assembly;

FIGURE 3 is an edge elevational view of the connecting rod assembly of FIGURE 1; and FIGURE 4 is a view similar to FIGURES 1 and 2, on a reduced scale, of a third embodiment of the connecting rod assembly, and FIGURE 5 is a view similar to FIGURES 1, 2 and 4, on an enlarged scale, of a fourth embodiment of the connecting rod assembly.

Referring more specifically to the drawings, and first with reference to FIGURES 1 and 3, the connecting rod assembly as illustrated therein and comprising the invention is designated generally 7 and includes an elongated shank 8 having a wrist pin bearing 9 at one end thereof and a crankpin bearing 10 at its opposite end.

The bore 11 of the bearing 9 contains a bushing 12 through which extends a wrist pin 13 of a piston 14 which has reciprocating movement in a cylinder 15.

The journal 10 includes an upper half or head 16 which is integral with the shank 8 and the bottom half or cap 17 which is detachably secured to the head 16 by nut and bolt fastenings 18, as is conventional. The bore 19 of the journal 10 is lined by a bushing 20 in which a crankpin 21 of a crankshaft 22 is journaled.

The piston 14 is shown in approximately the uppermost position of its travel in the cylinder 15, so that the crankpin 21 is disposed between said piston and the crankshaft 22. The longitudinal axis of the connecting rod assembly is indicated by the broken line 23 of FIGURE 1 which passes through the centers of the wrist pin 13 and crankshaft 22. However, it will be noted that the journal 10 is laterally offset to the right of the longitudinal center line 23, so that a broken line 24 in FIGURE 1 which passes centrally through the journal 10 and through the crankpin bore 19 is disposed to the right of the center line 23. Said line 24 also passes through the center of the crankpin 21 which is journaled in the bushing 20. Thus, the preponderance of the weight or the weight mass of the connecting rod assembly 7 is disposed to the right of the center line 23, and between said center line and the line 24.

This construction of the connecting rod assembly is utilized with a crankshaft which turns clockwise, as seen in FIGURE 1, so that the weight mass thereof is laterally offset in the same direction as the crankpin 21 is moving when travelling between the piston 14 and crankshaft 22. It will thus be seen that as the piston 14 moves upwardly prior to commencing its power stroke and as it approaches its position in FIGURE 1, the laterally offset journal 10 will cause the connecting rod assembly to swing counterclockwise about the wrist pin 13 similar to an unbalanced pendulum, having a tendency to swing further and with greater force in a counterclockwise direction than in a clockwise direction. This increased impetus of the connecting rod assembly in swinging counterclockwise toward its position of FIGURE 1 will propel the crankpin 21 past its top dead center position at the instant that the piston 14 commences moving toward the crankshaft 22 on its power stroke. This will insure that the torque will be exerted initially in a clockwise direction on the crankshaft at the commencement of the piston power stroke.

FIGURE 2 illustrates a second embodiment of the connecting rod assembly designated generally 25 including an elongated shank 26 having a wrist pin bearing 27 at one end and a crankpin journal 28 at its opposite end. The longitudinal axis of the connecting rod assembly 25 is indicated by the broken line 29, and it will be noted that said line 29 passes centrally through the journal 28, including the crankpin bore 30 and the bushing 31 thereof. Thus, the journal 28 is not laterally offset like the journal 10.

However, bearing 27 is laterally offset in the opposite direction or to the left as seen in FIGURE 2. The wrist pin 13 engages in the bushing 32 of the bearing 27 and the crankpin 22 engages turnably in the bushing 31 of the journal 28. When piston 14 commences its power stroke in cylinder 15, the center line 29 of the connecting rod assembly 25 which passes through the center of the crankpin 21 is disposed to the right of a broken line 33 which passes through the centers of a wrist pin 13 and crankshaft 22, so that the clockwise moving crankpin 21 is past the top dead center position thereof as indicated by the line 33 at the commencement of the power stroke of the piston, for accomplishing the same result as heretofore described in connection with the connecting rod assembly 7. It will also be apparent that the preponderance of the weight of the connecting rod assembly is disposed to the right of the line 33 so that the assembly 25 will have the same unbalanced pendulum action as heretofore described.

The aforedescribed connecting rod assemblies 7 and 25 will function efficiently on both four cycle and two cycle engines to increase the torque exerted on the crankshaft. In addition, the upper half of the connecting rod assembly 25 can be substituted for the upper half of the connecting rod assembly 7, so that the wrist pin bearing and crankpin journal will be offset in opposite directions, to produce even greater power and a "stroking" effect of the wrist pin. This will result in an even greater unbalanced pendulum action which is especially advantageous for high speed performance and results in a greater offsetting of the crankpin journal in the direction of rotation of the crankshaft, so that an increased torque will be imparted to the crankshaft at the commencement of the power stroke.

In the third embodiment of FIGURE 4, the connecting rod assembly 34 has a wrist pin bearing 36 at one end of its elongated shank 37 to receive the wrist pin 13. A crankpin journal 38 constituting the other end of the assembly 34 has a crankpin bore 39 lined with a bushing 40 to receive the crankpin 21 and which is eccentrically disposed relative to the periphery 41 of said journal 38. The bore 39 is laterally offset to the left of the center 42 of the journal 38 as defined by the center of its periphery 41.

With the crankshaft 22 rotating clockwise when the piston 14 is at its uppermost position in cylinder 15, and at the commencement of its power stroke, the center 42 will be to the right of a broken line 43 which passes through the centers of the wrist pin 13, crankpin 21 and crankshaft 22. Thus, the preponderance of the weight of the assembly 34 will be to the right of the line 43 in the leading portion of said assembly 34, so that this preponderance of weight will tend to carry the crankpin 21 past its top dead center position to insure maximum utilization of the force of the power stroke and to enable the crankpin to exert maximum torque on the crankshaft. Further, the unbalanced weight of the assembly 34 will create the same unbalanced pendulum effect, as previously described, as crankpin 21 approaches a top dead center position and during which time the connecting rod assembly is swinging counterclockwise about the wrist pin 13 as it is being propelled to the left.

FIGURE 5 discloses the fourth embodiment of the connecting rod assembly, designated generally 45, having a wrist pin bearing 47 at one end of its elongated shank 46 and which has a bore lined with a bushing 48 to receive the wrist pin 13. A crankpin journal 49 is provided at the other end of the shank 46 and has a crankpin bore 50. The journal 49 is offset slightly to the right of the shank 46 and the bore 50 is disposed substantially concentric thereof. However, the bore 50 is substantially larger than the crankpin 21 to receive an eccentric bushing 51, the bore 52 of which is laterally offset to the left of the center 53 of said bushing. The piston 14 is shown in an uppermost position in the cylinder 15 with the crankpin 21 disposed in a top dead center position between the clockwise rotating crankshaft 22 and the wrist pin 13, so that a broken line 54 passing through the centers of the wrist pin 13 and crankshaft 22 will also pass through the center of the crankpin 21 but is disposed to the left or in a trailing position relative to the center 53 of the bushing 51 and journal 49. Consequently, the preponderance of the weight of the connecting rod assembly 45 is disposed to the right of the center line 54 in the leading half of said assembly 45 for urging the crankpin 21 past its top dead center position and for producing the same unbalanced pendulum effect, as the crankpin is moving toward a top dead center position, as previously described in reference to the assembly 34.

Various other modifications and changes are contemplated and may obviously be resorted to without departing from the function or scope of the invention, as hereinafter defined by the appended claim.

I claim as my invention:

In an engine having a cylinder containing a reciprocating piston provided with a wrist pin and a crankshaft having a crankpin, a connecting rod having a bearing defining one end thereof pivotally engaging the wrist pin and a journal defining its opposite end in which the crankpin is journaled, said bearing and journal being laterally offset in opposite directions relative to the longitudinal axis of the connecting rod and in directions such that the weight mass of the connecting rod is always laterally offset toward the leading side of said journal with respect to the direction of rotation of the crankshaft when the crankpin is moving between the wrist pin and crankshaft.

References Cited by the Examiner
UNITED STATES PATENTS

| 1,326,476 | 12/1919 | Burkel et al. | 74—44 |
| 1,474,591 | 11/1923 | Hounsfield | 74—44 |
| 1,529,888 | 3/1925 | Hensley | 74—36 |
| 1,786,934 | 12/1930 | Briggs | 74—579 X |
| 1,924,516 | 8/1933 | Rider | 74—44 X |
| 1,988,571 | 1/1935 | Rider | 74—44 |
| 2,974,541 | 3/1961 | Dolza | 74—579 |

FOREIGN PATENTS

| 581,009 | 8/1958 | Italy. |

FRED C. MATTERN, Jr., *Primary Examiner.*
BROUGHTON G. DURHAM, *Examiner.*
D. H. THIEL, *Assistant Examiner.*